United States Patent
Engers et al.

(10) Patent No.: US 11,507,439 B1
(45) Date of Patent: Nov. 22, 2022

(54) APPLICATION PROGRAMMING INTERFACE AS A SERVICE

(71) Applicant: Amazon Technologies, Inc., Reno, NV (US)

(72) Inventors: Ross Bevan Engers, Cape Town (ZA); Jaco Hermanus Gabriel Le Roux, Cape Town (ZA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 90 days.

(21) Appl. No.: 16/392,247

(22) Filed: Apr. 23, 2019

Related U.S. Application Data (63) Continuation of application No. 15/799,169, filed on Oct. 31, 2017, now Pat. No. 10,303,532, which is a continuation of application No. 14/495,824, filed on Sep. 24, 2014, now Pat. No. 9,836,339.

(51) Int. Cl.
| | |
|---|---|
| *G06F 7/38* | (2006.01) |
| *G06F 9/54* | (2006.01) |
| *G06F 9/448* | (2018.01) |
| *G06F 9/455* | (2018.01) |
| *G06F 8/36* | (2018.01) |

(52) U.S. Cl.
CPC ........... *G06F 9/547* (2013.01); *G06F 9/4484* (2018.02); *G06F 9/45533* (2013.01); *G06F 9/54* (2013.01); *G06F 8/36* (2013.01)

(58) Field of Classification Search
CPC .... G06F 9/547; G06F 9/4484; G06F 9/45533; G06F 9/54; G06F 8/36
See application file for complete search history.

(56) References Cited

U.S. PATENT DOCUMENTS

| | | | |
|---|---|---|---|
| 8,683,560 B1 | 3/2014 | Brooker et al. | |
| 2004/0017392 A1* | 1/2004 | Welch | G06F 8/38 715/738 |
| 2007/0198656 A1 | 8/2007 | Mazzaferri et al. | |
| 2009/0271472 A1* | 10/2009 | Scheifler | G06F 9/5072 709/202 |
| 2010/0220622 A1 | 9/2010 | Wei | |
| 2010/0250748 A1 | 9/2010 | Sivasubramanian et al. | |
| 2010/0274890 A1 | 10/2010 | Patel et al. | |
| 2012/0233668 A1* | 9/2012 | Leafe | G06F 9/44526 726/4 |
| 2013/0086273 A1 | 4/2013 | Wray et al. | |

(Continued)

OTHER PUBLICATIONS

Mohammad Banikazemi et al. "Meridian: An SDN Platform for Cloud Network Services", (Year: 2013).*

(Continued)

*Primary Examiner* — Andy Ho
*Assistant Examiner* — Abdou K Seye
(74) *Attorney, Agent, or Firm* — BakerHostetler (57) ABSTRACT

An application programming interface (API) as a service is disclosed. In embodiments, a client provides code to be executed along with a configuration file for that code. Based on that, virtual machine(s) and load balancer(s) may be selected, a domain name service configured, and throttling and scaling configured. Through this, an API as a service may be provided on behalf of a client with minimal configuration required by the client or an administrator of a web service platform that provides the API as a service.

20 Claims, 8 Drawing Sheets

(56) References Cited

U.S. PATENT DOCUMENTS

| | | |
|---|---|---|
| 2013/0124807 A1 | 5/2013 | Nielsen et al. |
| 2013/0198319 A1 | 8/2013 | Shen et al. |
| 2014/0244585 A1* | 8/2014 | Sivasu .................... G06F 16/21 707/639 |
| 2015/0160956 A1* | 6/2015 | Shah ....................... H04L 63/08 718/1 |

OTHER PUBLICATIONS

Hong Liu et al "A Service-Oriented Virtual Machine for Grid Applications" (Year: 2006).

* cited by examiner

APPLICATION PROGRAMMING INTERFACE AS A SERVICE

CROSS REFERENCE TO RELATED APPLICATIONS

The present application is a continuation of U.S. patent application Ser. No. 15/799,169 entitled "APPLICATION PROGRAMMING INTERFACE AS A SERVICE", filed Oct. 31, 2017, (now U.S. Pat. No. 10,303,532 issued May 28, 2019) which is a continuation of U.S. patent application Ser. No. 14/495,824, entitled "APPLICATION PROGRAMMING INTERFACE AS A SERVICE", filed Sep. 24, 2014, (now U.S. Pat. No. 9,836,339, issued Dec. 5, 2017), the contents of which are hereby incorporated by reference in entirety.

BACKGROUND

There are web service platforms that may perform compute tasks on behalf of remote users. These web services platforms may perform these compute tasks via the use of one or more virtual machine (VM) instances. An example of a compute task that a web services platform may perform is hosting a web site or a web service.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Typically, it requires significant work to provide an application programming interface (API) as a service, which may include configuring one or more virtual machines, one or more load balancers, settings for scaling up the number of virtual machines and throttling, and domain name system (DNS) information. There exists techniques for providing a platform as a service, and website hosting as a service, but these differ from providing an API as a service. For example, a website as a service typically runs arbitrary content—whatever code it has without regard to what that code is, without regard to a specific API (the website typically is configured only to process pre-defined HTTP commands like GET and POST rather than a custom API), and also lacks configurations for throttling and scaling.

There are also techniques for providing an API framework. While these techniques may overcome the deficiency of a website as a service failing to provide for a specific API, these techniques still lack configurations for throttling and scaling. So, these API framework techniques are still deficient because additional work must be performed to configure throttling and scaling. As discussed below, the present techniques offer an improvement in providing for an API as a service, which reduces the amount of work required to configure an API by providing for features like throttling, scaling, and authentication to make API calls.

Figure 1:
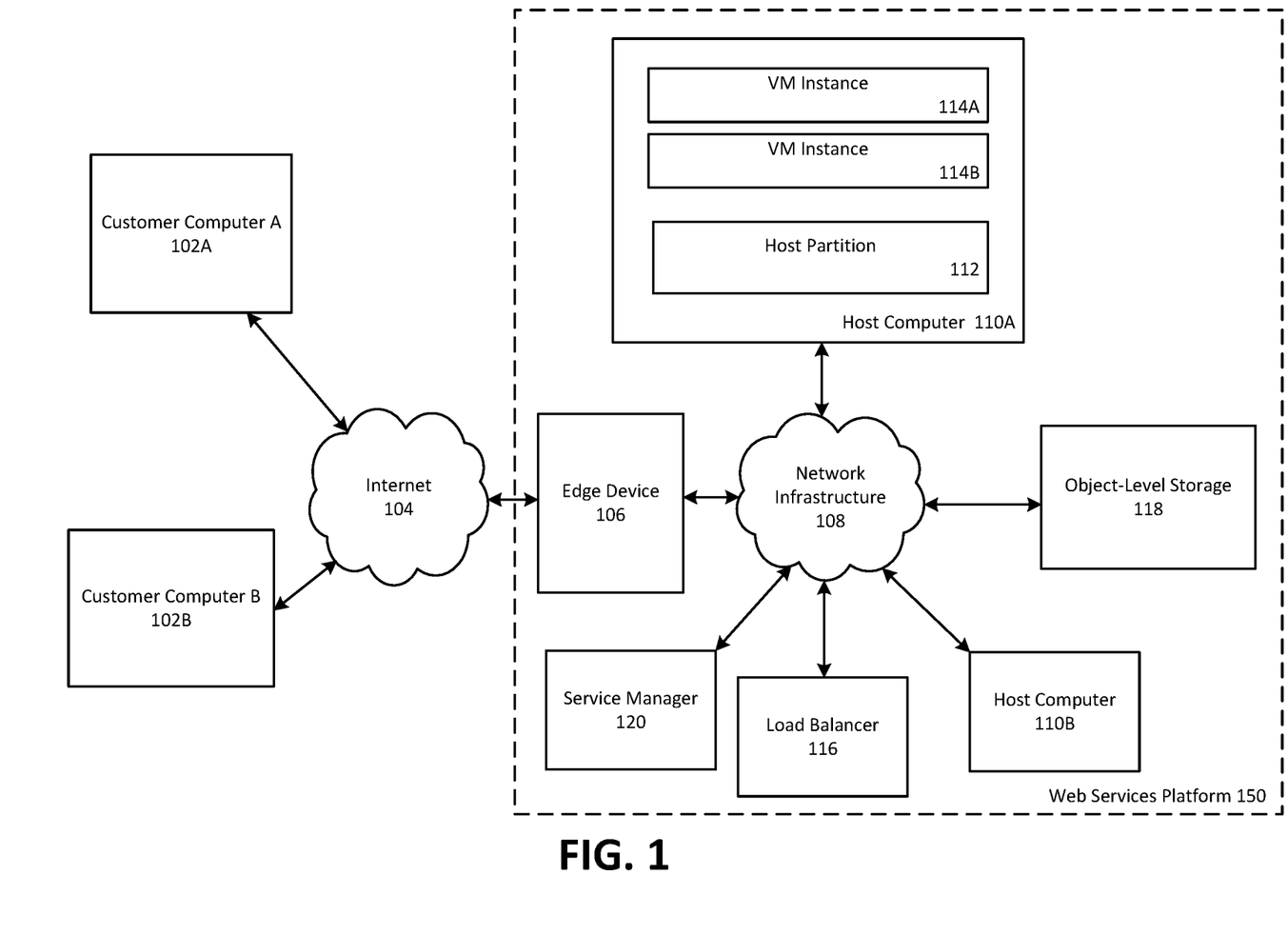
FIG. 1 depicts an example operating environment in which embodiments may be implemented.

FIG. 1 depicts an example operating environment in which embodiments may be implemented to provide an application programming interface (API) as a service. Generally, the operating environment of FIG. 1 includes a multi-customer web services platform 150 that comprises multiple virtual machine instances executing on host computers 110A and 110B (the instances and host computers may both be described as being computing nodes, and there may be more instances of host computers than the two that are depicted here), that may—individually or in concert—host a service that utilizes an API. Where these instances operate in concert, the load of the service may be balanced among the instances via load balancer 116.

Customer computer A 102A and customer computer B 102B are computers possessed by customers, which are configured to access the web services platform 150 via a public network, e.g., Internet 104. In turn, the connection point between the multi-customer web services platform 150 and Internet 104 is edge device 106. In embodiments, edge device 106 may be a gateway router. Within the multi-customer web services platform, edge device 106 connects to another computer network—network infrastructure 108. Network infrastructure 108 may be an intranet that is separate from Internet 104. Also connected to network infrastructure 108 are load balancer 116, service manager 120, object-level storage 118, and host computers 110A and 110B.

As depicted, web services platform 150 comprises host computer 110, which is configured to execute one or more virtual machine instances 114 (depicted here as VM instance 114A and VM instance 114B) and a host partition 112. While host computer 110 is depicted here as executing two VM instances 114, it may be appreciated that host computer 110 may execute more or fewer VM instances.

In embodiments, service manager 120 may comprise a computing node operable to receive computer code and configuration information from customer computer 102A or 102B. Service manager 120 may receive this information, and from it, create an API as a service that executes on web services platform 150. For example, service manager 120 may, based on the code and configuration information, provision one or more VM instances for the service, create a domain for the service, configure DNS information for the service, configure one or more network ports for the service, configure one or more load balancers for the service (such as load balancer 116), and execute the code on the instances.

In addition to this aspect of the web services platform, service manager 120 may store data in object-level storage 118, such as configuration information received from customer computer A 102A or customer computer B 102B. Object-level storage 118 is depicted as storing data as objects (e.g., a customer instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data.

Figure 2:
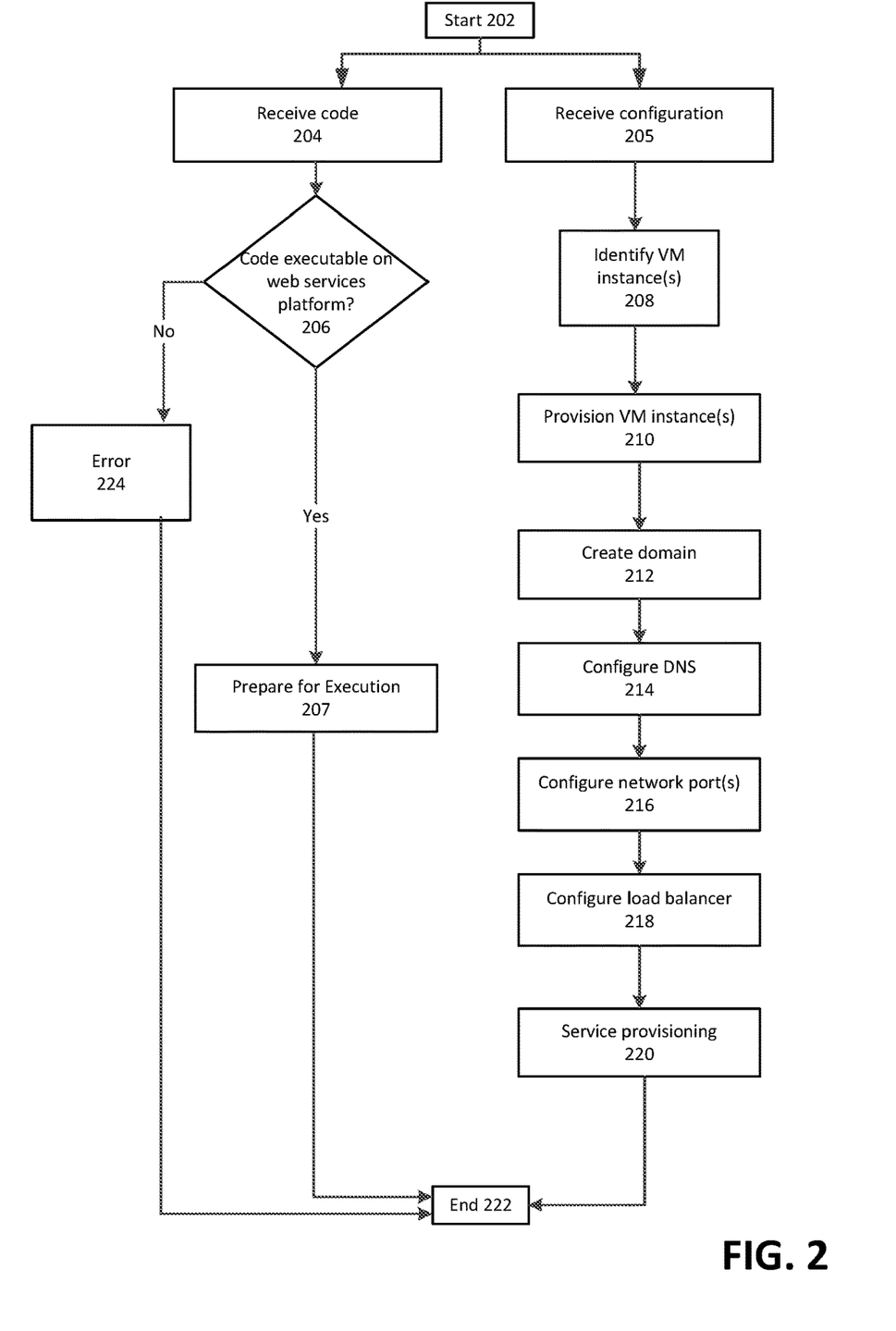
FIG. 2 depicts example operating procedures for a web services platform starting an application programming interface as a service.

FIG. 2 depicts example operating procedures for a web services platform starting an application programming interface as a service. In embodiments, the operating figures of FIG. 2 may be implemented by service manager 120 of FIG. 1. It may be appreciated that there may be embodiments that implement the operating procedures of FIG. 2 (and FIGS. 3-5) in a different order than is depicted. For example, there may be embodiments where operation 216 is implemented before operation 214. It may also be appreciated that there may be embodiments that implement more or fewer operating procedures than are depicted in FIG. 2 (and FIGS. 3-5). For example, there may be embodiments where VM instances are pre-provisioned, and where operation 210 is not implemented. The operating procedures of FIG. 2 begin with operation 202 and move to operation 204.

Operation 204 depicts receiving code and configuration information from a client. For example, service manager 120 of FIG. 1 may receive code and configuration information from customer computer A 102A or customer computer B 102B to set up an API as a service on web services platform 150. In embodiments, the code may be received directly from a client and may be stored at web services platform, such as in object-level storage 118 of FIG. 1 or in a version control system repository of web services platform 150.

This configuration information may define the API model by specifying the operations that may be performed, and the input and output expected from performing each operation. The configuration information may also specify an expected input/output rate of the API, a number of transactions per second (TPS) to be possible, a hostname, and scaling information. The configuration information may also specify a DNS name, a port, an authentication mechanism for entities invoking API calls, what VM instance types the code runs on, conditions to scale up behind a load balancer, and a TPS guarantee. The configuration information may be specified in a markup language such as XML (Extensible Markup Language). Once received, this code and configuration information may be stored in object-level storage 118 of FIG. 1.

In embodiments, operation 204 may comprise receiving a set of computer instructions and configuration information for the computer instructions, the set of computer instructions implementing the API when executed. In embodiments, operation 204 may comprise receiving a set of computer instructions and metadata about the computer instructions, the set of computer instructions corresponding to an application programming interface (API). After operation 204, the operating procedures of FIG. 2 move to operation 206.

Operation 206 depicts determining whether the code is executable on the web services platform. This may comprise, for example, determining what language and/or version the code is by examining a suffix of a file name (e.g., *.py), information within files that indicates the language and/or version, or information within the configuration information of operation 204. The code may be received uncompiled, or as a compiled executable, and where it is received as a compiled executable, operation 206 may comprise determining a target architecture for which the code has been compiled (e.g., Linux x86 with particular libraries needed for operation).

Where it is determined that the code is executable on the web services platform, the operating procedures of FIG. 2 move to operation 208. Instead, where it is determined that the code is not executed on the web services platform, the operating procedures of FIG. 2 move to operation 224.

Operation 208 is reached from operation 206 where it is determined that the code is executable on the web services platform. Operation 208 depicts identifying VM instance(s). VM instances may have particular processing capabilities, such as processor, memory, operating system type, and libraries available on the operating system. Certain code may be executed on different types of VM instances based on the type of stack the code runs on (e.g., Linx x86) or performance requirements of the code (e.g., a TPS guarantee).

In embodiments, operation 208 may comprise determining a type of virtual machine (VM) instance to execute at least a part of the set of computer instructions based on the configuration information. In embodiments, operation 208 may comprise determining a type of virtual machine (VM) instance to execute at least a part of the set of computer instructions based on the metadata.

In embodiments, operation 208 may comprise determining the type of VM instance to execute at least the part of the set of computer instructions based at least in part on a software process or library that the VM instance is configured to execute, the part of the set of computer instructions utilizing the software process or library during execution. In embodiments, operation 208 may comprise determining the type of VM instance to execute at least the part of the set of computer instructions based at least in part on a computer language of the set of computer instructions. After operation 208, the operating procedures of FIG. 2 move to operation 210.

Operation 210 depicts provisioning VM instance(s). Provisioning the VM instances may comprise taking VM image files, spinning them up into executing VMs, and configuring them so that they may execute the code, such as by assigning them network addresses (e.g., IP addresses).

In embodiments, the VM instance(s) may be pre-provisioned, and selected from a plurality of pre-provisioned instances with various characteristics. This approach may speed implementing the operating procedures of FIG. 2 by avoiding time taken specifically to provision instances once code is received. After operation 210, the operating procedures of FIG. 2 move to operation 212.

Operation 212 depicts creating a domain. This may be a network domain in which the API runs, and may be created by sending a request to an entity of the web services platform that creates and manages domains for the web services platform. After operation 212, the operating procedures of FIG. 2 move to operation 214.

Operation 214 depicts configuring DNS. This may comprise sending a request to an entity that manages DNS for web services platform to add associations between IP addresses of VM instances and load balancers used in the API as a service with hostnames for those devices. In embodiments, operation 214 may comprise setting a domain name service (DNS) configuration associated with the VM instance based on the metadata. In embodiments, operation 214 may comprise setting a network hostname associated with the VM instance based on the metadata. After operation 214, the operating procedures of FIG. 2 move to operation 216.

Operation 216 depicts configuring network port(s). The API as a service may communicate on specific ports on VM instances. In embodiments, operation 216 may comprise configuring the VM instances to use those ports for communication, including configuring an internal firewall of the VM instances to allow network traffic on those ports, and it may comprise configuring an external firewall to allow network traffic on those ports for those particular VMs. In embodiments, operation 214 may comprise setting a network port that the VM instance listens on for calls according to the API based on the metadata. After operation 216, the operating procedures of FIG. 2 move to operation 218.

Operation 218 depicts configuring a load balancer. This may comprise configuring a load balancer to balance load among the plurality of provisioned instances, such as by assigning incoming API requests to the plurality of instances in a round robin fashion. Where a single instance is utilized, a load balancer may still be configured, should scaling up the API as a service at a later time involve adding more instances.

In embodiments, operation 218 may comprise executing at least a second part of the computer instructions on a second VM instance; and operating a load balancer configured to balance load among the VM instance and the second VM instance in processing calls according to the API. In embodiments, operation 218 may comprise determining a validation test for the VM instance from the metadata; and setting a load balancer not to balance load to the VM instance upon determining that the VM instance fails the validation test. After operation 218, the operating procedures of FIG. 2 move to operation 220.

Operation 220 depicts executing code on the VM instance(s). This may comprise copying at least part of the code received in operation 204 to each of the VM instances, and executing it upon those instances. In embodiments, the API as a service may comprise multiple VM instances performing different roles, such as in a three-tier database. In such a scenario, one VM instance may execute one part of the code to, e.g., effectuate an application server role, and another VM instance may execute another part of the code to, e.g., effectuate a database management system role.

In embodiments, the API established may be a one-time API and operation 220 may comprise terminating executing at least the part of the computer instructions on the VM instance in response to determining that a predetermined condition indicated in the metadata has been reached. A disposable API such as this may be used for such purposes as creating one-time tokens, or reducing security risks by limiting the API to operating while it is needed, and not leaving it running at other times at which attackers may probe the API as a service for vulnerabilities.

In embodiments, operation 220 may comprise executing at least the part of the computer instructions on a VM instance having the determined type. After operation 220, the operating procedures of FIG. 2 move to operation 222, where the operating procedures of FIG. 2 end.

Operation 224 is reached from operation 206 where it is determined that the code is not executable on the web services platform. Operation 224 depicts raising an error. This error may be a message sent to the entity that the code and configuration information was received from that indicates that the code may not be executed on web services platform 150 of FIG. 1. After operation 224, the operating procedures of FIG. 2 move to operation 222 where the operating procedures of FIG. 2 end.

Figure 3:
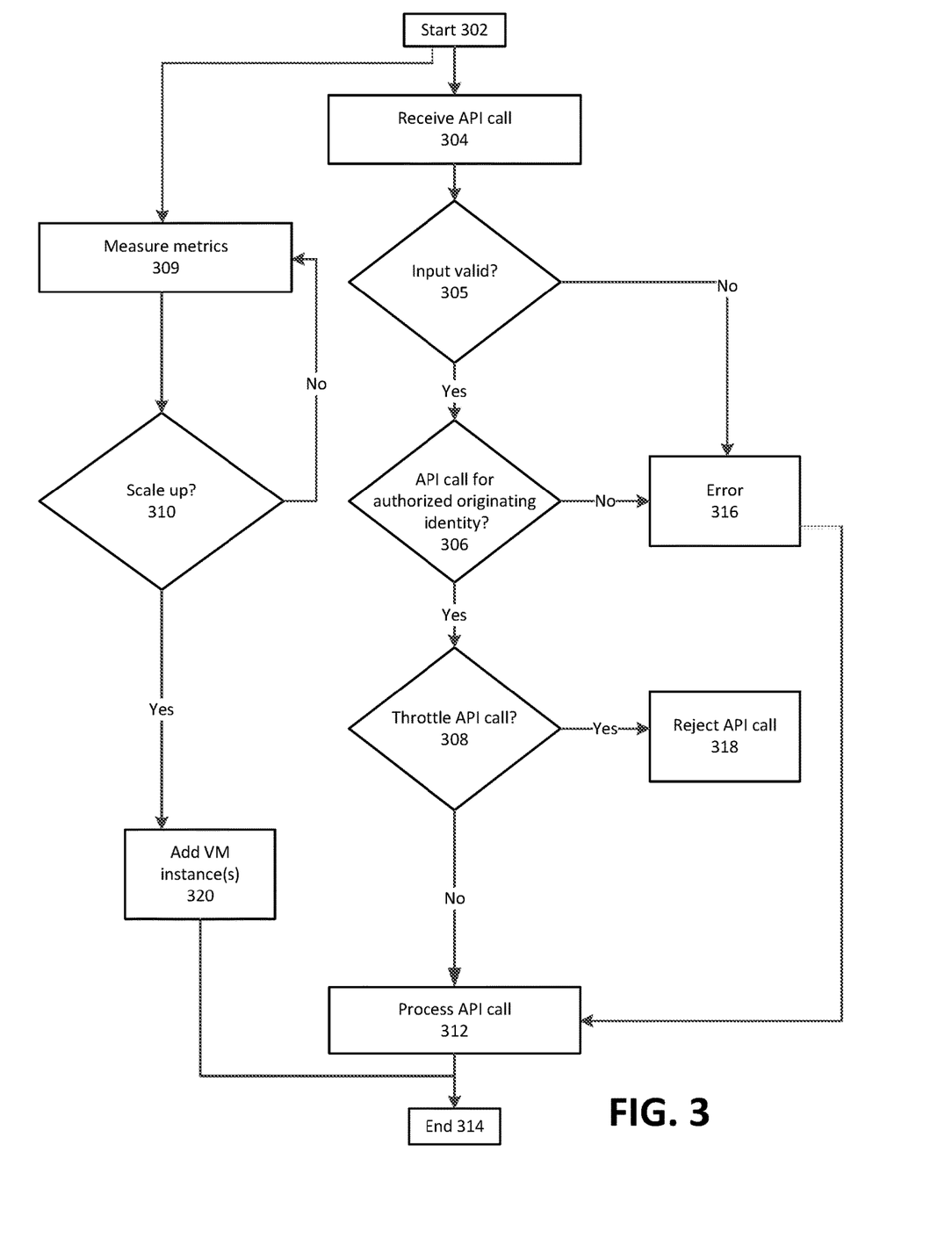
FIG. 3 depicts example operating procedures for an application programming interface as a service processing an application programming interface call.

FIG. 3 depicts example operating procedures for an application programming interface as a service processing an application programming interface call. In embodiments, the operating figures of FIG. 3 may be implemented by an API as a service that executes on web services platform 150 of FIG. 1. The operating procedures of FIG. 3 begin with operation 302 and move to operation 304.

Operation 304 depicts receiving an API call. This may be an API call as defined for the API as a service established via the operating procedures of FIG. 2, and may be originated by any entity that is authorized—i.e., not solely by the entity that provided the code in operation 204 to be executed. After operation 304, the operating procedures of FIG. 3 move to operation 360.

Operation 306 depicts determining whether the API call is authorized for the originating entity. Authorization may be restricted to particular network subnets or security groups, or be based on credentials such as user names and passwords. In embodiments, operation 306 may comprise determining to process the API call based at least in part on an identity of an entity that originated the API call and authorization information indicated in the metadata. In embodiments, this may comprise determining to process the API call based at least in part on a subnet or security group associated with the entity that originated the API call.

Where it is determined in operation 306 that the API call is authorized for the originating entity, the operating procedures of FIG. 3 move to operation 308. Instead, where it is determined that the API call is not authorized for the originating entity, the operating procedures of FIG. 3 move to operation 316.

Operation 308 depicts determining whether the API call is to be throttled. In embodiments, operation 308 may be implemented in a similar manner as aspects of the operating procedures of FIG. 4. Where it is determined in operation 308 that the API call is to be throttled, the operating procedures of FIG. 3 move to operation 310. Instead, where it is determined that the API call is not to be throttled, the operating procedures of FIG. 3 move to operation 318.

Operation 310 depicts determining whether the service should be scaled up based on the API call. In embodiments, operation 310 may be implemented in a similar manner as the operating procedures of FIG. 5. Where it is determined in operation 310 that the service should be scaled up based on the API call, the operating procedures of FIG. 3 move to operation 312. Instead, where it is determined that the service should not be scaled up based on the API call, the operating procedures of FIG. 3 move to operation 320.

Operation 312 is reached from operation 310 where it is determined that the service should not be scaled up based on the API call, or from operation 320. Operation 320 depicts processing the API call. This may comprise, for example, performing processing as indicated by the API call. This may include, for example, a VM instance streaming a video to a requestor in response to an API call that indicates a request for a particular video.

In embodiments, operation 312 may comprise processing an API call made to the service with the at least part of the computer instructions being executed on the VM instance. In embodiments, operation 312 may comprise receiving a request to update the set of computer instructions independent of an identification of the VM instance; and in response to determining that at least the part of the set of computer instructions executes on the VM instance, updating at least the part of the set of computer instructions that execute on the VM instance.

In embodiments, operation 312 may comprise storing information about one or more calls according to the API made to the VM instance, the information indicating an identity of an entity that made the one or more calls, or a time at which the one or more calls were made. Such metrics may be used to generate reports that indicate, e.g., how many times a particular operation of an API was called in a given time period, and by which entities. After operation 312, the operating procedures of FIG. 3 move to operation 314, where the operating procedures of FIG. 3 end.

Operation 316 is reached from operation 306 where it is determined that the API call is not authorized for the originating entity. Operation 316 depicts raising an error. This error may comprise informing the requestor that the requestor is not authorized for the API call, such as through a mechanism specified in the API, and/or logging an indication of the unauthorized API call.

In embodiments, an error may be an alert that indicates that that the API call was originated by an entity that was not authorized to originate the API call (as in here), and also an alert that indicates that an amount of processing by the VM instance associated with processing the API call is above a predetermined threshold. After operation 316, the operating procedures of FIG. 3 move to operation 314, where the operating procedures of FIG. 3 end.

Operation 318 is reached from operation 308 where it is determined that the API call is to be throttled. Operation 318 depicts rejecting the API call. In embodiments, operation 318 may be implemented in a similar manner as operation 416 of FIG. 4. After operation 318, the operating procedures of FIG. 3 move to operation 314, where the operating procedures of FIG. 3 end.

Operation 320 is reached from operation 310 where it is determined that the service should be scaled up based on the API. Operation 320 depicts adding VM instance(s). In embodiments, operation 320 may be implemented in a similar manner as operation 512 of FIG. 5. After operation 320, the operating procedures of FIG. 3 move to operation 312.

Figure 4:
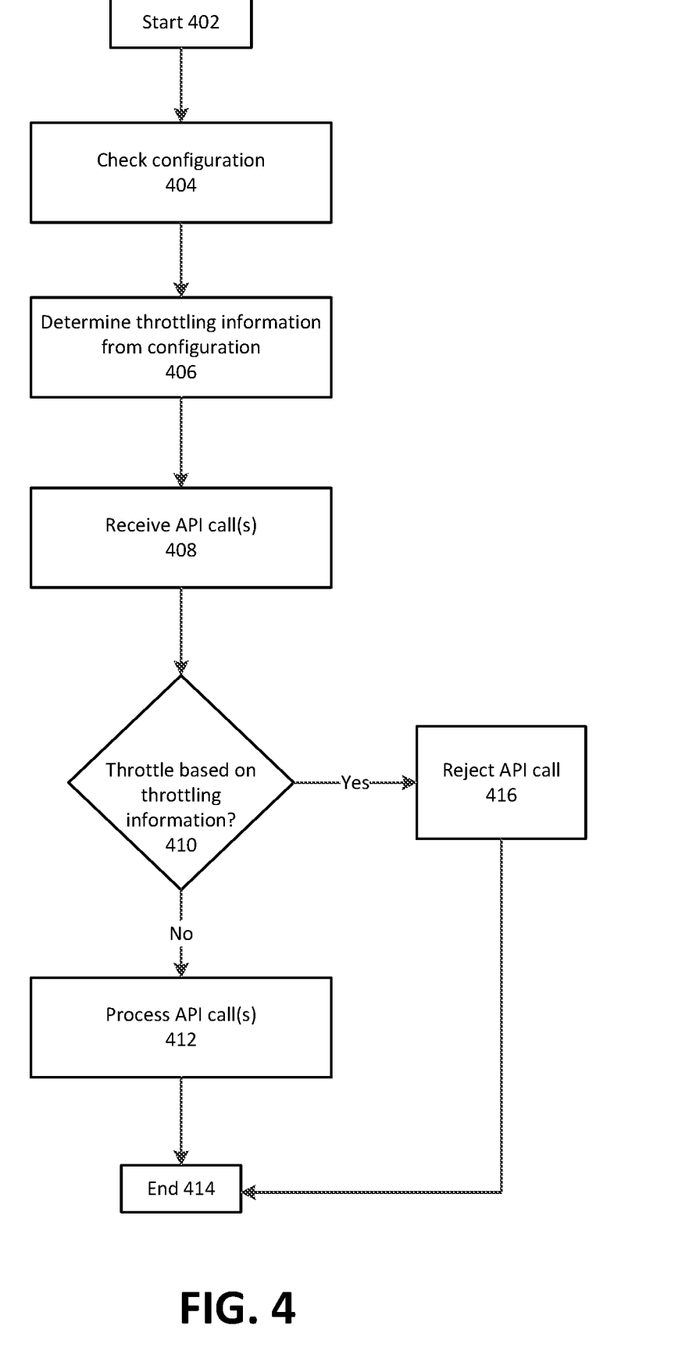
FIG. 4 depicts example operating procedures for an application programming interface as a service throttling application programming interface calls.

FIG. 4 depicts example operating procedures for an application programming interface as a service throttling application programming interface calls. In embodiments, the operating figures of FIG. 4 may be implemented by an API as a service that executes on web services platform 150 of FIG. 1. The operating procedures of FIG. 4 begin with operation 402 and move to operation 404.

Operation 404 depicts receiving code and configuration information from a client. In embodiments, operation 404 may be implemented in a similar manner as operation 204 of FIG. 2. After operation 404, the operating procedures of FIG. 4 move to operation 406.

Operation 406 depicts determining throttling information from the configuration information. This may comprise, for example, an indication in the configuration information of a maximum number of API calls per unit of time permitted overall, for a particular API call or resource, or from a particular requestor. Where the configuration file is an XML file, the throttling information may comprise an element such as "<throttling><number>100</number><time_period>seconds</time_period></throttling>" that indicates that the throttling is set at 100 API calls per second, and may be determined by parsing the XML file. After operation 406, the operating procedures of FIG. 4 move to operation 408.

Operation 408 depicts receiving API call(s). In embodiments, operation 408 may be implemented in a similar manner as operation 304 of FIG. 3. After operation 408, the operating procedures of FIG. 4 move to operation 410.

Operation 410 depicts determining whether to throttle based on the throttling information. The number of API calls received in a given time period may be tracked, and when each new API call is received, the statistics may be updated and then checked to see if throttling limit is violated (e.g., where the throttle limit is set at 100 API calls/second, and 101 API calls have been received in the past second, the throttling limit may be violated). These statistics may be maintained based on the particulars of the throttling limit (e.g., a maximum rate of all API calls, of particular API calls, of particular API calls per user, etc.).

In other embodiments, rather than checking the throttling limit per API call, it may be checked periodically, such as per every 50 API calls. That may reduce the amount of processing associated with monitoring the throttling limit without weakening the throttling limit itself (e.g., it may be OK to occasionally process a burst of 150 API calls in a second, so long as that is not sustained, and the sustained rate rarely goes above 100 API calls/second). Where in operation 410 it is determined to throttle based on the throttling information, the operating procedures of FIG. 4 move to operation 416. Instead, where in operation 410 it is determined not to throttle based on the throttling information, the operating procedures of FIG. 4 move to operation 412.

Operation 412 is reached from operation 410 where it is determined not to throttle based on the throttling information. Operation 412 depicts processing the API call(s). In embodiments, operation 412 may be implemented in a similar manner as operation 312 of FIG. 3. After operation 412, the operating procedures of FIG. 4 move to operation 416, where the operating procedures of FIG. 4 end.

Operation 416 is reached from operation 410 where it is determined to throttle based on the throttling information. Operation 416 depicts rejecting the API call(s). In embodiments, this may comprise not processing the API call(s). In other embodiments, this may comprise sending the requesting entity an indication that the throttling limit has been reached, according to a mechanism specified in the API. In embodiments, operation 416 may comprise limiting an amount of calls according to the API that are processed to below a predetermined threshold After operation 416, the operating procedures of FIG. 4 move to operation 414, where the operating procedures of FIG. 4 end.

Figure 5:
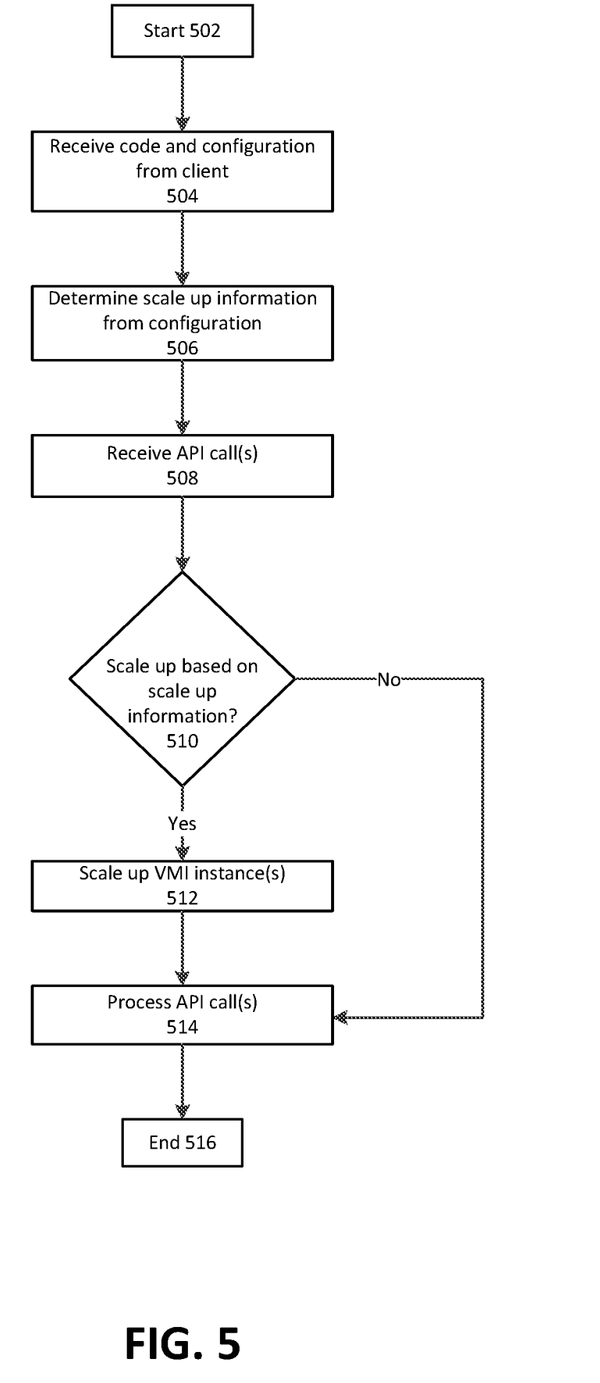
FIG. 5 depicts example operating procedures for an application programming interface as a service scaling up.

FIG. 5 depicts example operating procedures for an application programming interface as a service scaling up. In embodiments, the operating figures of FIG. 5 may be implemented by an API as a service that executes on web services platform 150 of FIG. 1. The operating procedures of FIG. 5 begin with operation 502 and move to operation 504.

Operation 504 depicts receiving code and configuration information from a client. In embodiments, operation 504 may be implemented in a similar manner as operation 204 of FIG. 2. After operation 504, the operating procedures of FIG. 5 move to operation 506.

Operation 506 depicts determining scale up information from the configuration information. In embodiments, operation 506 may be implemented in a similar manner as operation 406 of FIG. 4, but regarding scale up information rather than throttling information. After operation 506, the operating procedures of FIG. 5 move to operation 508.

Operation 508 depicts receiving API call(s). In embodiments, operation 508 may be implemented in a similar manner as operation 304 of FIG. 3. After operation 508, the operating procedures of FIG. 5 move to operation 510.

Operation 510 depicts determining whether to scale up based on the scale up information. For example, service manager 120 of FIG. 1 may monitor load information for the API as a service that executes on web services platform 150. When this load information exceeds a predetermined threshold specified in the configuration information, then the API as a service may be scaled up. An example of scale up information may comprise processing more than a predetermined number of API calls per second per VM instance in the API as a service. Another example may be a predetermined number of VM instances exceeding a load average above a predetermined threshold (e.g., in a Linux system, a load average above 0.80).

In embodiments, operation 510 may comprise executing at least a second part of the computer instructions on a second VM instance in response to determining that an amount of processing associated with processing calls according to the API on the VM instance is above a predetermined threshold. In embodiments, this may comprise determining the predetermined threshold based on the metadata. Where in operation 510 it is determined to scale up based on the scale up information, the operating procedures of FIG. 5 move to operation 512. Instead, where in operation 510 it is determined not to scale up based on the scale up information, the operating procedures of FIG. 5 move to operation 514.

Operation 512 is reached from operation 510 where it is determined to scale up based on the scale up information. Operation 512 depicts scaling up the VM instances. This may comprise provisioning and executing code on one or more additional VMs, and configuring a load balancer to distribute load to these new VM instances as well as the pre-existing VM instances, as described with respect to the operating procedures of FIG. 2.

In embodiments, operation 512 may comprise executing at least a second part of the computer instructions on a second VM instance in response to determining that an amount of processing associated with processing calls according to the API on the VM instance is above a predetermined threshold. After operation 512, the operating procedures of FIG. 5 move to operation 514.

Operation 514 is reached from operation 512, or from operation 510 where it is determined not to scale up based on the scale up information. Operation 512 depicts processing the API call(s). In embodiments, operation 514 may be implemented in a similar manner as operation 312 of FIG. 3. After operation 514, the operating procedures of FIG. 5 move to operation 516, where the operating procedures of FIG. 5 end.

Figure 6:
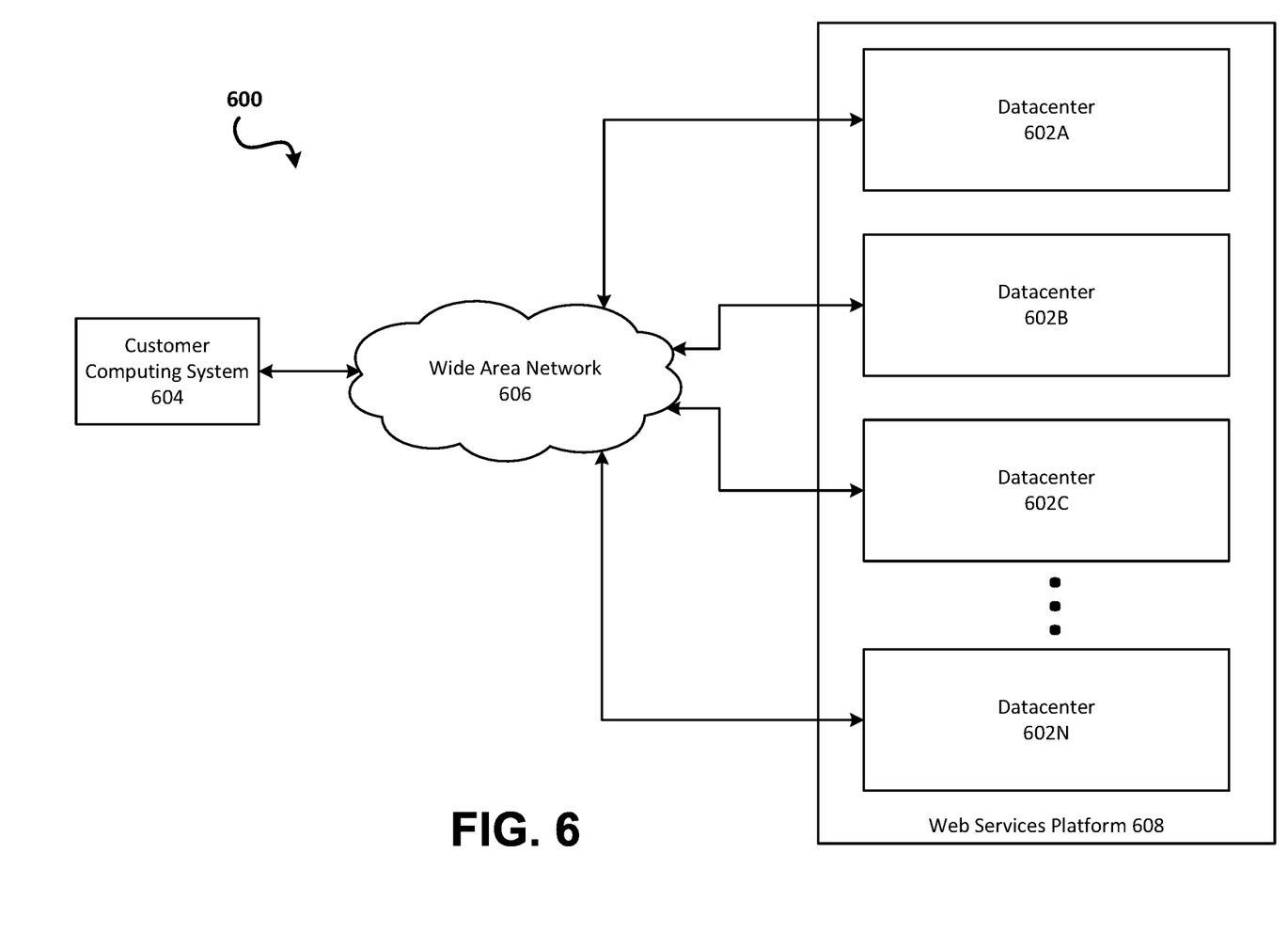
FIG. 6 depicts a web services platform, such as in FIG. 1, that comprises a plurality of datacenters.
Figure 7:
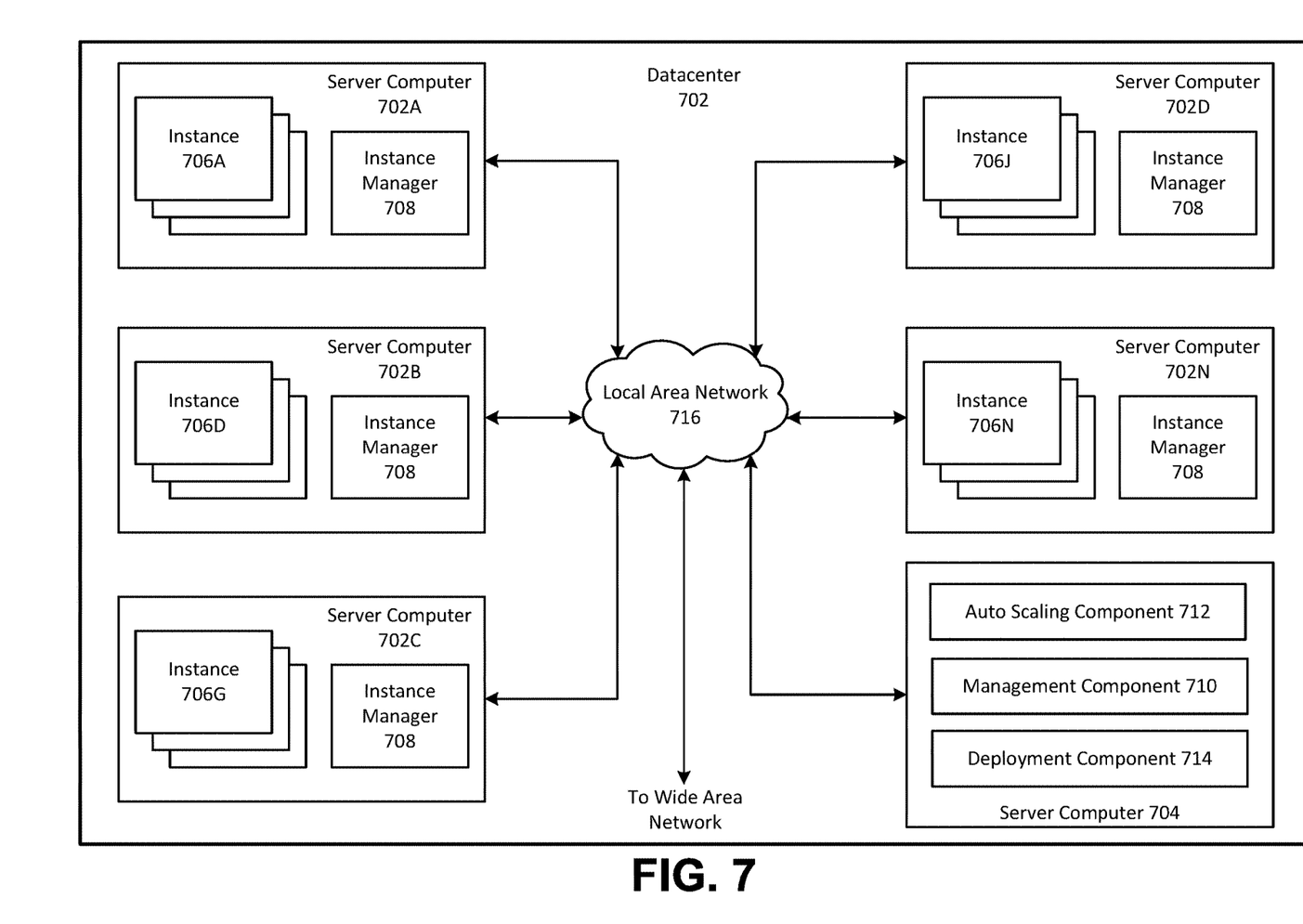
FIG. 7 depicts a datacenter, such as in FIG. 6, that comprises a plurality of computers.
Figure 8:
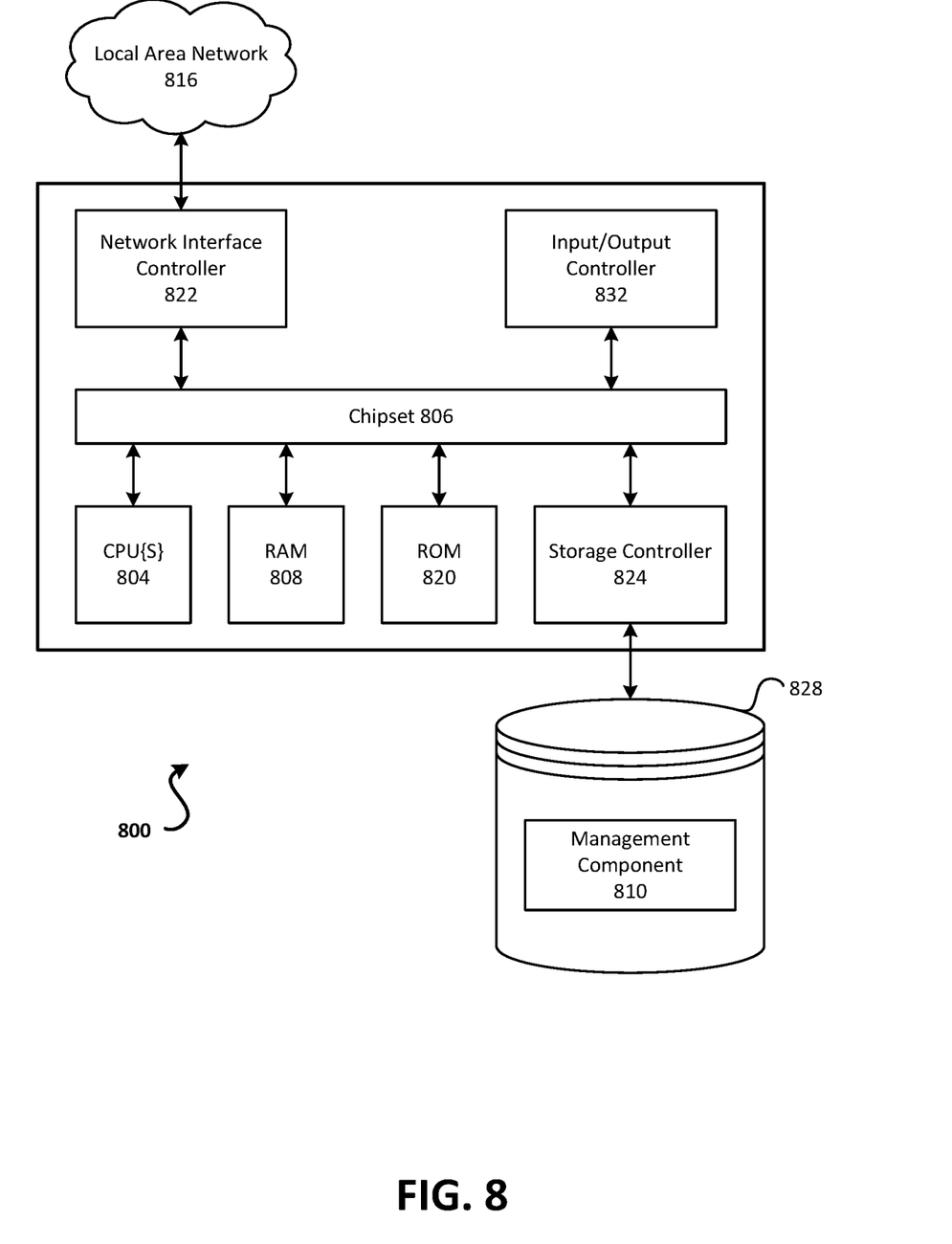
FIG. 8 depicts a computer that may be part of a datacenter, such as in FIG. 7.

FIGS. 6-8 are similar to FIG. 1 in that they depict example operating environments in which embodiments disclosed herein may be implemented, and said figures depict these operating environments at varying levels of granularity. FIG. 6 generally depicts a web services platform that comprises a plurality of datacenters. FIG. 7 generally depicts a datacenter that comprises a plurality of computers. FIG. 8 generally depicts a computer that may be part of a datacenter.

It may be appreciated that the operating environments of FIGS. 6-8 may be used to implement aspects of the operating environment of FIG. 1. For example, edge device 66, host computer 70, database 76, access manager 80, and password reset service 82 may be implemented in a datacenter 602A of FIG. 6, or across multiple datacenters 602A, 602B, 602C, and/or 602N of FIG. 6. Likewise, customer computer A 62A and customer computer B 62B may each be customer computing system 604 of FIG. 6.

Turning now to details of FIG. 6, this figure depicts an example of a suitable computing environment in which embodiments described herein may be implemented. A cloud service provider (such as web services platform 608) may configure the illustrated computing environment to host virtual clouds of entities and to enable communication paths between these virtual clouds that may otherwise be isolated. In particular, FIG. 6 is a system and network diagram that shows an illustrative operating environment 600 that includes a web services platform 608 for implementing virtual clouds and for providing on-demand access to compute resources, such as virtual machine instances. Web services platform 608 can provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 608 may be enabled by one or more datacenters 602A-602N, which may be referred herein singularly as "datacenter 602" or in the plural as "datacenters 602." Datacenters 602 may be facilities that house and operate computer systems and associated components and may include redundant and backup power, communications, cooling, and security systems. Datacenters 602 may be located in a same geographical area, such as in a same facility, and may be interconnected using private networks, such as high-speed fiber optic networks, controlled and managed by a service provider of web services platform 608. Datacenters 602 may also be distributed across geographically disparate locations and may be interconnected in part using public networks, such as the Internet. One illustrative configuration for datacenter 602 that implements the concepts and technologies disclosed herein is described below with regard to FIG. 7.

Entities of web services platform 608 may access the compute resources provided by datacenters 602 over a Wide Area Network (WAN) 606. Although a WAN is illustrated in FIG. 6, it should be appreciated that a Local Area Network (LAN), the Internet, or any other networking topology known in the art that connects datacenters 602 to remote entities and other users may be utilized. It should also be appreciated that combinations of such networks may also be utilized.

An entity or other entities that are customers of web services platform 608 may utilize a computing system 604 to access the compute resources provided by datacenters 602. Customer computing system 604 comprises a computer capable of accessing web services platform 608, such as a server computer, a desktop or laptop personal computer, a tablet computer, a wireless telephone, a PDA, an e-reader, a game console, a set-top box, or any other computing node.

As is described in greater detail below, customer computing system 604 may be utilized to configure aspects of the compute resources provided by web services platform 608. In this regard, web services platform 608 may provide a web interface through which aspects of its operation may be configured through the use of a web browser application program executing on customer computing system 604. Alternatively, a stand-alone application program executing on customer computing system 604 may access an application programming interface (API) exposed by web services platform 608 for performing the configuration operations. Other mechanisms for configuring the operation of web services platform 608, including launching new virtual machine instances on web services platform 608, may also be utilized.

According to embodiments disclosed herein, capacities of purchased compute resources provided by web services platform 608 can be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 608 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 7 depicts a computing system diagram that illustrates one configuration for datacenter 602 that implements web services platform 608. With regards to elements of the web services platform 150 previously described with respect to FIG. 1, host computer 70 may be a server computer 702 of FIG. 7 (which itself may be computer 800 of FIG. 8), host partition 72 may be an instance of instance manager 708 (where a host partition serves a hypervisor-type role), and VM instances 74A and 74B may each be an instance 706 of FIG. 7. Database 76, access manager 80, and password reset service 82 of FIG. 1 may each be an instance of server computer 704 of FIG. 7.

The example datacenter 602 shown in FIG. 7 may include several server computers 702A-702N, which may be referred herein singularly as "server computer 702" or in the plural as "server computers 702," for providing compute resources for hosting virtual clouds and for executing applications. Server computers 702 may be standard tower or rack-mount server computers configured appropriately for providing the compute resources described above. For instance, in one implementation server computers 702 may be configured to provide instances 706A-706N of compute resources.

Instances 706A-706N, which may be referred herein singularly as "instance 706" or in the plural as "instances 706," may be virtual machine instances. As known in the art, a virtual machine instance is an instance of a software implementation of a machine (i.e., a computer) that executes programs like a physical machine. In the example of virtual machine instances, each server 702 may be configured to execute an instance manager 708 capable of executing the instances. Instance manager 708 may be a hypervisor or another type of program configured to enable the execution of multiple instances 706 on a single server 702, for example. As discussed above, each of instances 706 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 602 shown in FIG. 7 may also include a server computer 704 reserved for executing software components for managing the operation of datacenter 602, server computers 702, and instances 706. In particular, server computer 704 may execute a management component 710. As discussed above, working between FIGS. 6 and 7, an entity of web services platform 608 may utilize customer computing system 604 to access management component 710 to configure various aspects of the operation of web services platform 608 and instances 706 purchased by the entity. For example, the entity may purchase instances and make changes to the configuration of the instances. The entity may also specify settings regarding how the purchased instances are to be scaled in response to demand. The entity may also provide requests to launch instances to management component 710.

As also described briefly above, an auto scaling component 712 may scale instances 706 based upon rules defined by an entity of web services platform 608. For example, auto scaling component 712 may allow an entity to specify scale up rules for use in determining when new instances should be instantiated and scale down rules for use in determining when existing instances should be terminated.

As discussed briefly above, datacenter 602 may also be configured with a deployment component 714 to assist entities in the deployment of new instances 706 of compute resources. Deployment component 714 may receive a configuration from an entity that includes data describing how new instances 706 should be configured. For example, the configuration may specify one or more applications that should be installed in new instances 706, provide scripts and/or other types of code to be executed for configuring new instances 706, provide cache warming logic specifying how an application cache should be prepared, and other types of information.

Deployment component 714 may utilize the entity-provided configuration and cache warming logic to configure, prime, and launch new instances 706. The configuration, cache warming logic, and other information may be specified by an entity using management component 710 or by providing this information directly to deployment component 714. Other mechanisms may also be utilized to configure the operation of deployment component 714.

In the example datacenter 602 shown in FIG. 7, an appropriate LAN 716 may be utilized to interconnect server computers 702A-702N and server computer 704. LAN 716 may also be connected to WAN 606 illustrated in FIG. 6. It should be appreciated that the network topology illustrated in FIGS. 6 and 7 has been greatly simplified and that many more networks and networking devices may be utilized to interconnect the various computing systems disclosed herein. Appropriate load balancing devices or software modules may also be utilized for balancing a load between each of datacenters 602A-602N, between each of server computers 702A-702N in each datacenter 602 and between instances 706 purchased by each entity of web services platform 608. These network topologies and devices should be apparent to those skilled in the art.

It should be appreciated that datacenter 602 described in FIG. 7 is merely illustrative and that other implementations may be utilized. In particular, functionality described herein as being performed by management component 710, auto scaling component 712, and deployment component 714 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

FIG. 8 depicts an example computer architecture for a computer 800 capable of executing the above-described software components. With regard to the example web services platform 150 described with respect to FIG. 1, host computer 70 and database 76, as well as customer computer A 62A and customer computer B 62B, may each be implemented in computer 800 of FIG. 8.

The computer architecture shown in FIG. 8 illustrates a conventional server computer, workstation, desktop computer, laptop, tablet, network appliance, PDA, e-reader, digital cellular phone, or other computing node, and may be utilized to execute any aspects of the software components presented herein described as executing within datacenters 602A-602N, on server computers 702A-702N, on the customer computing system 604, or on any other computing system mentioned herein.

Computer 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. CPUs 804 may be standard programmable processors that perform arithmetic and logical operations necessary for the operation of computer 800.

CPUs 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 806 may provide an interface between CPUs 804 and the remainder of the components and devices on the baseboard. Chipset 806 may provide an interface to a random access memory (RAM) 808 used as the main memory in computer 800. Chipset 806 may further provide an interface to a computer-readable storage medium, such as a read-only memory (ROM) 820 or non-volatile RAM (NVRAM) (not shown), for storing basic routines that may help to start up computer 800 and to transfer information between the various components and devices. ROM 820 or NVRAM may also store other software components necessary for the operation of computer 800 in accordance with the embodiments described herein.

Computer 800 may operate in a networked environment using logical connections to remote computing nodes and computer systems through LAN 816. Chipset 806 may include functionality for providing network connectivity through a network interface controller (NIC) 822, such as a gigabit Ethernet adapter. NIC 822 may be capable of connecting the computer 800 to other computing nodes over LAN 816. It should be appreciated that multiple NICs 822 may be present in computer 800, connecting the computer to other types of networks and remote computer systems.

Computer 800 may be connected to a mass storage device 828 that provides non-volatile storage for the computer. Mass storage device 828 may store system programs, application programs, other program modules, and data, which have been described in greater detail herein. Mass storage device 828 may be connected to computer 800 through a storage controller 824 connected to chipset 806. Mass storage device 828 may consist of one or more physical storage units. Storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 800 may store data on mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 828 is characterized as primary or secondary storage and the like.

For example, computer 800 may store information to mass storage device 828 by issuing instructions through storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 800 may further read information from mass storage device 828 by detecting the physical states or characteristics of one or more particular locations within the physical storage units.

In addition to mass storage device 828 described above, computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 800.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 828 may store an operating system utilized to control the operation of the computer 800. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 828 may store other system or application programs and data utilized by computer 800, such as management component 810 and/or the other software components described above.

Mass storage device 828 or other computer-readable storage media may also be encoded with computer-executable instructions, which, when loaded into computer 800, transforms the computer from a general-purpose computing system into a special-purpose computer capable of implementing the embodiments described herein. These computer-executable instructions transform computer 800 by specifying how CPUs 804 transition between states, as described above. Computer 800 may have access to computer-readable storage media storing computer-executable instructions, which, when executed by computer 800, may perform operating procedures depicted in FIGS. 2-5.

Computer 800 may also include an input/output controller 832 for receiving and processing input from a number of input devices, such as a keyboard, a mouse, a touchpad, a touch screen, an electronic stylus, or other type of input device. Similarly, input/output controller 832 may provide output to a display, such as a computer monitor, a flat-panel display, a digital projector, a printer, a plotter, or other type of output device. It will be appreciated that computer 800 may not include all of the components shown in FIG. 8, may include other components that are not explicitly shown in FIG. 8, or may utilize an architecture completely different than that shown in FIG. 8.

As described herein, a computing node may be a physical computing node, such as computer 800 of FIG. 8. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for providing an application programming interface (API) service through a web services provider, comprising:
receiving at the web services provider from a user of the web services provider, a plurality of computer instructions associated with the API service and configuration information associated with the API service;
deploying, based on the configuration information, the plurality of computer instructions on the web services provider for carrying out computer processing by the plurality of computer instructions based on subsequent invocations of the API service; and
creating a network address on the web services provider for exposing the API service over a network wherein API service invocation received over the network causes execution of the plurality of computer instructions.

2. The method as recited in claim 1, wherein creating a network address on the web services provider comprises creating a domain for the API.

3. The method as recited in claim 2 further comprising configuring a domain name service by adding an association between an IP address of the API service on the webs services provider with a hostname.

4. The method as recited in claim 1 further comprising scaling a processing capacity for the API service on the web services provider upon determining that load information exceeds a predetermined threshold specified in the configuration information.

5. The method as recited in claim 4, wherein determining that load information exceeds a predetermined threshold specified in the configuration information comprises determining that the expected input/output rate of the API service is insufficient.

6. The method as recited in claim 1 further comprising throttling a number of calls processed by the API service on the web services provider to maintain the number of API calls per unit of time at or below a threshold indicated in the configuration information.

7. The method as recited in claim 1, wherein deploying the plurality of computer instructions on the web services provider comprises identifying one or more VM instances to host the API service.

8. A non-transitory computer-readable medium having stored thereon computer readable instructions that upon execution on a computer device performs operations for providing an application programming interface (API) service through a cloud service, comprising:
processing a set of computer instructions and configuration information received at the cloud service from a user of the cloud service, the computer instructions and configuration information associated with the API service;
deploying, based on the configuration information, the set of computer instructions on the cloud service for carrying out computer processing by the set of computer instructions based on subsequent invocations of the API service; and
creating a network address on the cloud service for exposing the API service over a network wherein API service invocation received over the network causes execution of the set of computer instructions.

9. The non-transitory computer-readable medium as recited in claim 8, wherein creating a network address on the cloud service comprises creating a domain for the API.

10. The non-transitory computer-readable medium as recited in claim 9, wherein the computer readable instructions that upon execution on a computer device performs operations comprising configuring a domain name service by adding an association between an IP address of the API service on the cloud service with a hostname.

11. The non-transitory computer-readable medium as recited in claim 8, wherein the computer readable instructions that upon execution on a computer device performs operations comprising scaling a processing capacity for the API service on the cloud service upon determining that load information exceeds a predetermined threshold specified in the configuration information.

12. The non-transitory computer-readable medium as recited in claim 11, wherein determining that load information exceeds a predetermined threshold specified in the configuration information comprises determining that the expected input/output rate of the API service is insufficient.

13. The non-transitory computer-readable medium as recited in claim 8, wherein the computer readable instructions that upon execution on a computer device performs operations comprising throttling a number of calls processed by the API service on the cloud service to maintain the number of API calls per unit of time at or below a threshold indicated in the configuration information.

14. The non-transitory computer-readable medium as recited in claim 8 wherein deploying the plurality of computer instructions on the cloud service comprises identifying one or more VM instances to host the API service.

15. A web services provider comprising at least one computing device, the at least one computing device configured to at least:
   process a plurality of computer instructions and configuration information received by the web services provider, the computer instructions and configuration information associated with an API service;
   deploy, based on the configuration information, the plurality of computer instructions for carrying out computer processing by the plurality of computer instructions based on subsequent invocations of the API service; and
   create a network address for exposing the API service over a network wherein API service invocation received over the network causes execution of the plurality of computer instructions.

16. The web services provider as recited in claim 15, wherein creating a network address on the web services provider comprises creating a domain for the API.

17. The web services provider as recited in claim 16, wherein the at least one computing device is configured to at least configure a domain name service by adding an association between an IP address of the API service on the webs services provider with a hostname.

18. The web services provider as recited in claim 15, wherein the at least one computing device is configured to at least scale a processing capacity for the API service on the web services provider upon determining that load information exceeds a predetermined threshold specified in the configuration information.

19. The web services provider as recited in claim 18, wherein determining that load information exceeds a predetermined threshold specified in the configuration information comprises determining that the expected input/output rate of the API service is insufficient.

20. The web services provider as recited in claim 15, wherein the at least one computing device is configured to at least throttle a number of calls processed by the API service on the web services provider to maintain the number of API calls per unit of time at or below a threshold indicated in the configuration information.

* * * * *